April 1, 1952 — J. McEWAN — 2,590,992
SAW SHARPENER
Filed Oct. 10, 1947 — 2 SHEETS—SHEET 2
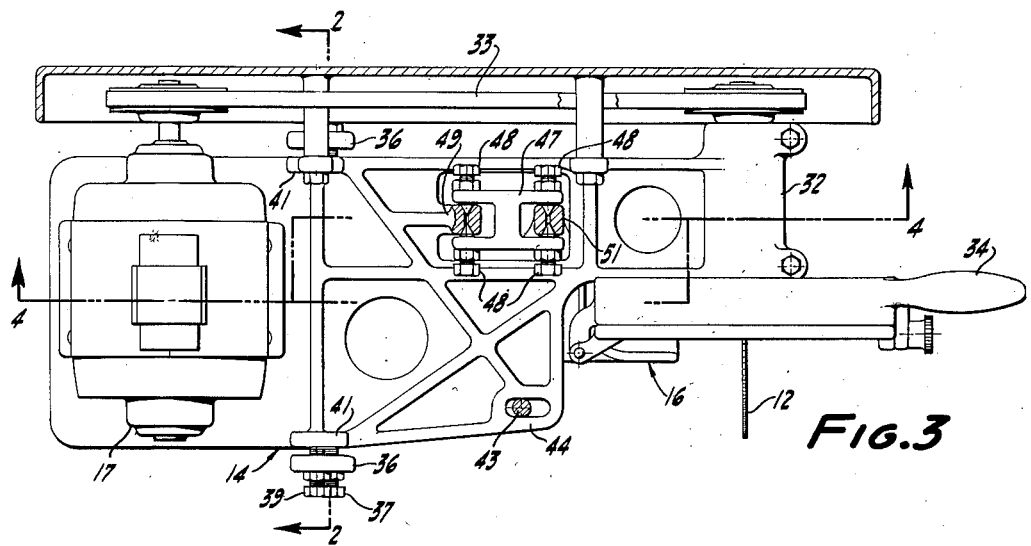
FIG.3
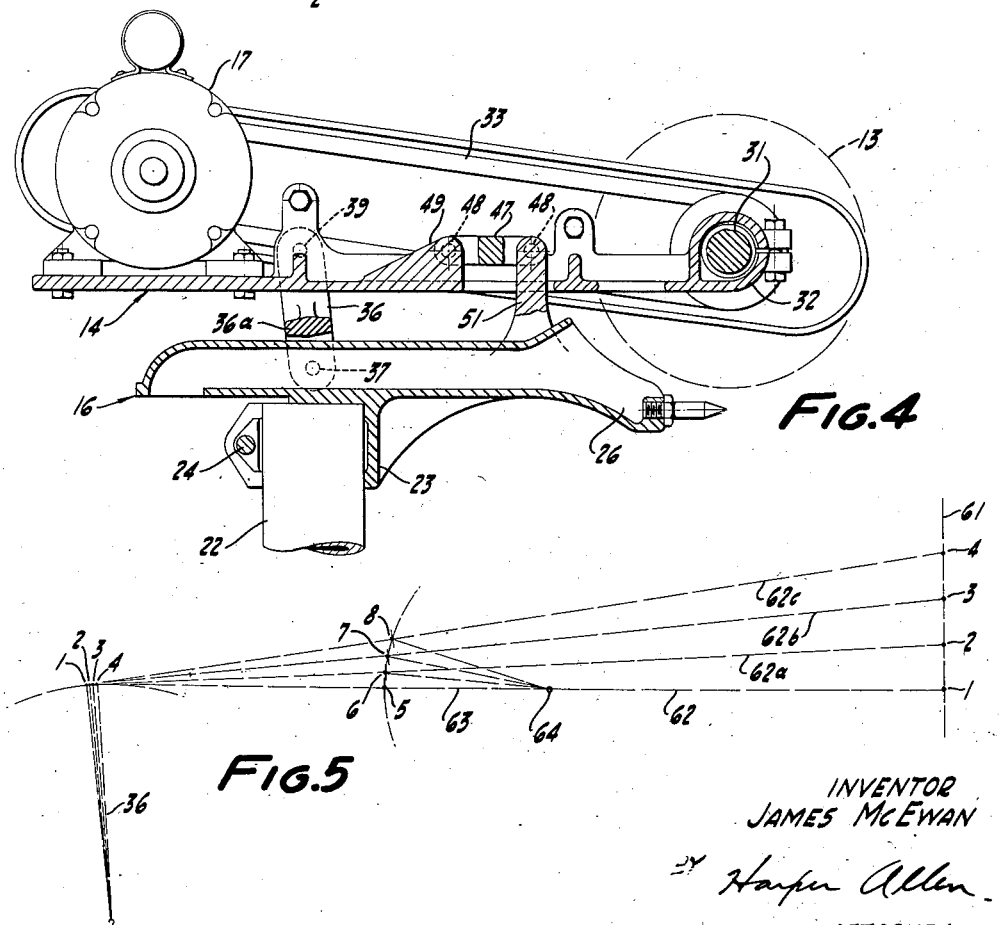
FIG.4
FIG.5
INVENTOR
JAMES McEWAN
BY Harper Allen
ATTORNEY Patented Apr. 1, 1952

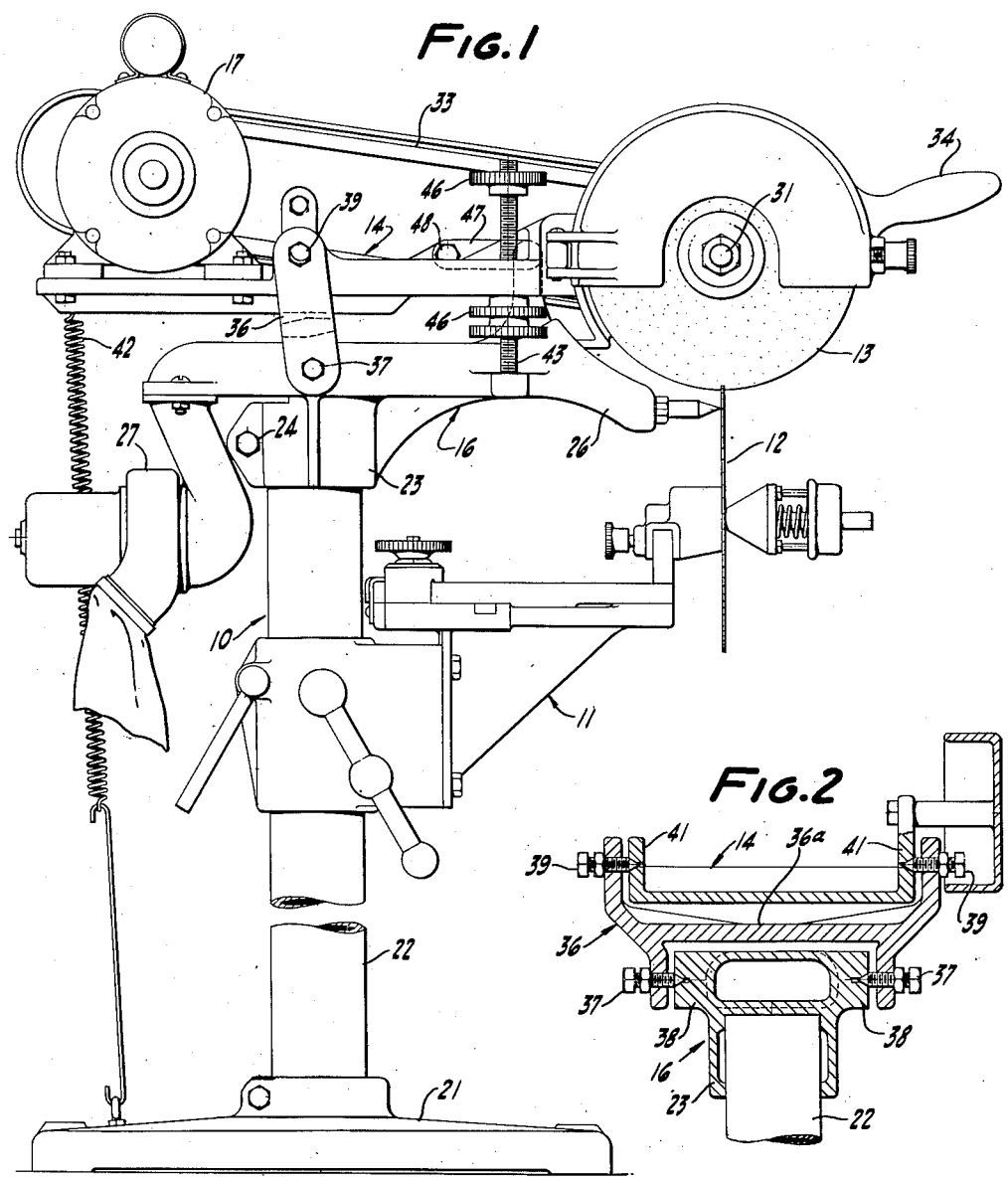

2,590,992

UNITED STATES PATENT OFFICE 2,590,992

SAW SHARPENER

James McEwan, San Jose, Calif.

Application October 10, 1947, Serial No. 779,001

4 Claims. (Cl. 76—40)

1

The present invention relates to saw sharpeners and is concerned more particularly with the provision of a saw sharpener in which the sharpening device has linear movement with respect to the teeth of the saw during the sharpening operation.

In the sharpening of saws it has long been recognized that the sharpening device should have a straight line in and out movement with respect to the tooth of the saw during the sharpening operation to obtain the desired tooth profile. In accordance with the instant invention, this result is accomplished in a simple positive manner by means which lends itself to easy operation and economical manufacture. Also, the mounting of the saw sharpening device is carried out in conjunction with the provision of a dust chute to receive the metal dust incident to the sharpening operation.

The above and other objects of the invention are attained in a preferred embodiment of the invention as shown in the accompanying drawings, in which:

Figure 1 is a side elevational view of the new sharpener.

Figure 2 is a fragmentary sectional view taken as indicated by the line 2—2 in Figure 3.

Figure 3 is a plan view of the sharpener with certain parts shown in section.

Figure 4 is a vertical sectional view of the sharpener taken as indicated by the lines 4—4 in Figure 3, with the upper and lower portions of the view taken in different planes.

Figure 5 is a diagram illustrating the linkage arrangement and the method of obtaining such a linkage arrangement by lay-out.

Referring to Figure 1, in general the saw sharpener includes a base portion or support structure 10 on which a saw support 11 is mounted for supporting a saw 12 in relation to a saw sharpening device or wheel 13. The wheel 13 is carried by a mounting bracket or support element 14 which is supported in a manner later described on a dust chute 16 forming a part of the base portion 10. The drive motor 17 for the wheel 13 is also mounted on the bracket 14.

The base portion 10 (Figure 1) includes a pedestal 21 from which there projects upwardly a post 22 carrying the saw support 11 and the dust chute 16. The saw support or positioner 11 is of conventional construction and is releasably clamped on the post 22 so that the height of the saw support 11 can be adjusted with reference to the type and size of saw to be sharpened. The dust chute 16 has its split mounting boss 23

2 clamped on the upper end of the post by means of a bolt 24 and the dust chute 16 is provided with an inclined intake end 26 which is adjacent the uppermost teeth of the saw 12 and which conforms generally to the outline of the sharpening wheel 13. The discharge end of the chute 16 has mounted thereon a conventional form of blower 27 discharging into a bag 28.

The sharpening wheel 13 (Figures 1, 3 and 4) has its support shaft 31 journalled in a boss 32 of the bracket 14, and the shaft 31 is driven through a suitable pulley and belt arrangement 33 from the motor 17. The support bracket 14 for the sharpening wheel 13 has a floating mounting on the dust chute 16 to provide for linear in and out movement of the wheel 13 with respect to the saw 12 under manual control of the operator utilizing the handle 34. This mounting includes a main support link 36 (Figures 1, 2 and 5) which is provided with a link portion at each end joined by a connecting web 36a. The lower ends of the link portions 36 (Figure 2) have aligned pivotal mountings by means of tapered studs 37 engaging in complementary respective tapered recesses in opposite bosses 38 formed on the dust chute 16. The upper ends of the link portions 36 have similar pivotal connections 39 with upstanding ears 41 of the bracket 14. To counterbalance the bracket 14 with respect to the above described floating pivotal mounting, a spring 42 extends between the motor end of the bracket and the pedestal 21. Also, to provide for limited in and out movement of the wheel 13 with respect to the saw 12, the dust chute 16 carries an upstanding stud 43 (Figures 1 and 3) which passes through an apertured portion 44 of the bracket 14 and has respective upper and lower stop nuts 46 threaded thereon.

To control the pivotal movement of the bracket with respect to its supporting link and to constrain the up and down movement of the sharpening wheel 13 to a linear path, a control supporting and connecting link 47 is provided (Figures 1, 3 and 4) which is forked at each end and carries respective sets of tapered pivot screws 48 engaging respectively in a boss 49 of the bracket 14 and an upstanding boss 51 on the dust chute 16.

It will be noted that the respective links 36 and 47 extend substantially at right angles to each other so that while the wheel end of the bracket 14 is moving up and down with reference to the saw 12 about its pivot axis 39, it is also controlled in a back and forth movement by the link 47, and the relative dimensions of the parts are selected so that the resultant movement of the sharpening wheel 13 is linear. This will best be understood by reference to Figure 5 which illustrates a preferred method of determining the desired relation of the parts. In Figure 5 the vertical line 61 represents the desired linear path of movement of the sharpening device, the horizontal line 62 represents the horizontal position of the bracket, with distance between the points 1—1 correspondig to the distance from the center of the sharpening wheel to the axis of the pivotal connection to the link 36, whose line is correspondingly numbered. The portion 63 of the line 62 corresponds to the link 47. To determine the relation of the parts, the points 1, 2, 3 and 4 are laid out equi-distance apart along the line 61, and the corresponding positions of the upper end of the link 36 are correspondingly numbered. The points 1—1, 2—2, 3—3 and 4—4 are connected to obtain the line 62 and the line 62a, 62b and 62c. Having selected an appropriate location of the connecting link 47 between the link 46 and the path of movement of the wheel, equal distances are laid out from the points 1, 2, etc. on the line 61 to locate the respective points 5, 6, 7 and 8 on the line 62, 62a, etc. These points 5 through 8 lie on the circumference of a circle having its center at 64 which corresponds to the pivot point in the boss 51. This graphic lay-out then determines the desired length of the link 47, and the location of its respective pivotal connections to the bracket 14 and to the dust chute 16.

From the above description it will be seen that as the operator moves the sharpening wheel 13 from its normal uppermost position into engagement with the saw 12 as seen in Figure 1, the combined action of the compensating links 36 and 47 provides for substantially linear movement of the wheel 13. In this way, the desired profile of the saw teeth is obtained.

While I have shown and described certain preferred embodiments of the invention, it is apparent that the invention is capable of variation and modification from the forms shown so that its scope should be limited only by the scope of the claims appended hereto.

I claim:

1. In a saw sharpener, a base, a saw positioner on the base, a sharpening device for engaging the teeth of a saw on said positioner, a horizontally disposed support bracket for said device and mounting means for said bracket providing for substantially straight-line movement of said sharpening device with respect to a saw on said positioner, said mounting means including a pair of spaced apart rigidly connected support links each pivoted respectively to said base and said bracket about aligned horizontal vertically spaced axes, and also including a horizontally disposed control link pivotally connected about respective parallel horizontal axes between said bracket and said base.

2. In a saw sharpener, a base including a dust chute having an intake opening, a saw positioner on the base for supporting a saw with certain of the teeth thereof aligned with the intake opening of the dust chute, a sharpening device for engaging the teeth of a saw on said positioner adjacent said intake opening, a horizontally disposed support bracket for said sharpening device, a vertically disposed support element for said sharpening device having respective spaced pivotal connections to each side of said bracket and to said dust chute, and a horizontally disposed control link pivotally connected between said dust chute and said bracket to provide for substantially straight-line movement of said sharpening device with respect to a saw.

3. In a saw sharpener, a base, a saw positioner on the base, a sharpening device for engaging the teeth of a saw on said positioner, a horizontally disposed support bracket for said device, and a mounting structure for said bracket providing for substantially straight line movement of said sharpening device with respect to a saw on said positioner, said mounting structure comprising a link pivotally connected to said base and pivotally connected to said bracket about respective axes extending transversely of said bracket to provide for in and out movement of said bracket and the sharpening device thereon with respect to a saw as well as for relative endwise movement of said bracket with respect to said base, said mounting structure also including a compensating link disposed lengthwise of said bracket and pivotally connected to said base and said bracket about respective axes disposed transversely of said bracket and in parallel relation to said first named axes.

4. In a saw sharpener, a support structure, a saw positioner on the support structure, a sharpening device for engaging the teeth of a saw on said positioner, a support element for said device, and mounting means for said support element providing for substantially straight line movement of said sharpening device with respect to a saw on said positioner, said mounting means including a link pivotally connected to said support structure and pivotally connected to said support element about respective axes extending transversely of said support element to provide for endwise movement of said support element relative to said support structure and for movement of said support element and the sharpening devices thereon relative to a saw in said positioner, said mounting means also including a compensating link disposed substantially lengthwise of said support element and pivotally connected to said support structure and said support element about respective axes disposed in parallel relation to said first-named axes.

JAMES McEWAN.

REFERENCES CITED

The following references are of record in the file of this patent:

UNITED STATES PATENTS

| Number | Name | Date |
|---|---|---|
| 410,444 | Radant | Sept. 3, 1889 |
| 1,227,556 | Armstrong | May 22, 1917 |
| 1,501,564 | Lifflander | July 15, 1924 |
| 1,502,085 | Armstrong | July 22, 1924 |
| 1,832,878 | Porter | Nov. 24, 1931 |
| 2,292,595 | Andrianoff | Aug. 11, 1942 |